United States Patent
Arroyo et al.

(10) Patent No.: US 10,387,349 B1
(45) Date of Patent: Aug. 20, 2019

(54) DYNAMICALLY BYPASSING A PERIPHERAL COMPONENT INTERCONNECT SWITCH

(71) Applicant: International Business Machines Corporation, Armonk, NY (US)

(72) Inventors: Jesse P. Arroyo, Rochester, MN (US); Ellen M. Bauman, Rochester, MN (US); Daniel J. Larson, Rochester, MN (US); Timothy J. Schimke, Stewartville, MN (US)

(73) Assignee: International Busniess Machines Corporation, Armonk, NY (US)

( * ) Notice: Subject to any disclaimer, the term of this patent is extended or adjusted under 35 U.S.C. 154(b) by 0 days.

(21) Appl. No.: 16/109,168

(22) Filed: Aug. 22, 2018

(51) Int. Cl.
*G06F 13/40* (2006.01)
*G06F 13/42* (2006.01)

(52) U.S. Cl.
CPC ...... *G06F 13/4022* (2013.01); *G06F 13/4027* (2013.01); *G06F 13/4282* (2013.01); *G06F 2213/0026* (2013.01); *G06F 2213/0058* (2013.01)

(58) Field of Classification Search
None
See application file for complete search history.

(56) References Cited

U.S. PATENT DOCUMENTS

| 7,293,125 | B2 | 11/2007 | McAfee et al. |
| 9,311,266 | B2 | 4/2016 | Jones et al. |
| 2016/0179735 | A1 | 6/2016 | Zou et al. |
| 2017/0068630 | A1 | 3/2017 | Iskandar et al. |

FOREIGN PATENT DOCUMENTS

WO  WO-2016/175837 A1  11/2016

OTHER PUBLICATIONS

Krishnan, *Evaluation of an Integrated PCI Express IO Expansion and Clustering Fabric*, 16th IEEE Symposium on High Performance Interconnects, Aug. 2008, pp. 93-100, IEEE Computer Society, Washington, D.C.
U.S. Appl. No. 15/921,126, to Jesse P. Arroyo et al., entitled, *Combining Switch Slot Resources*, assigned to International Business Machines Corporation, 27 pages, filed Mar. 14, 2018.
AUS820170166US01, Appendix P; List of IBM Patent or Applications Treated as Related, Aug. 22, 2018, 2 pages.

*Primary Examiner* — Farley Abad
*Assistant Examiner* — Dayton Lewis-Taylor
(74) *Attorney, Agent, or Firm* — Peter J. Edwards (57) ABSTRACT

Dynamically bypassing a peripheral component interconnect (PCI) switch including preparing, during run time, a PCI host bridge for disconnection from the PCI switch, wherein the PCI host bridge is connected to a first PCI slot via the PCI switch; toggling, during run time, an electrical switch, wherein toggling the electrical switch bypasses the PCI switch and creates a direct connection between the PCI host bridge and the first PCI slot; and configuring, during run time, the PCI host bridge for the direct connection between the PCI host bridge and the first PCI slot.

20 Claims, 6 Drawing Sheets

DYNAMICALLY BYPASSING A PERIPHERAL COMPONENT INTERCONNECT SWITCH

BACKGROUND

Field of the Invention

The field of the invention is data processing, or, more specifically, methods, apparatus, and products for dynamically bypassing a peripheral component interconnect switch.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for dynamically bypassing a peripheral component interconnect (PCI) switch are disclosed in this specification. Dynamically bypassing a PCI switch includes preparing, during run time, a PCI host bridge for disconnection from the PCI switch, wherein the PCI host bridge is connected to a first PCI slot via the PCI switch; toggling, during run time, an electrical switch, wherein toggling the electrical switch bypasses the PCI switch and creates a direct connection between the PCI host bridge and the first PCI slot; and configuring, during run time, the PCI host bridge for the direct connection between the PCI host bridge and the first PCI slot.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
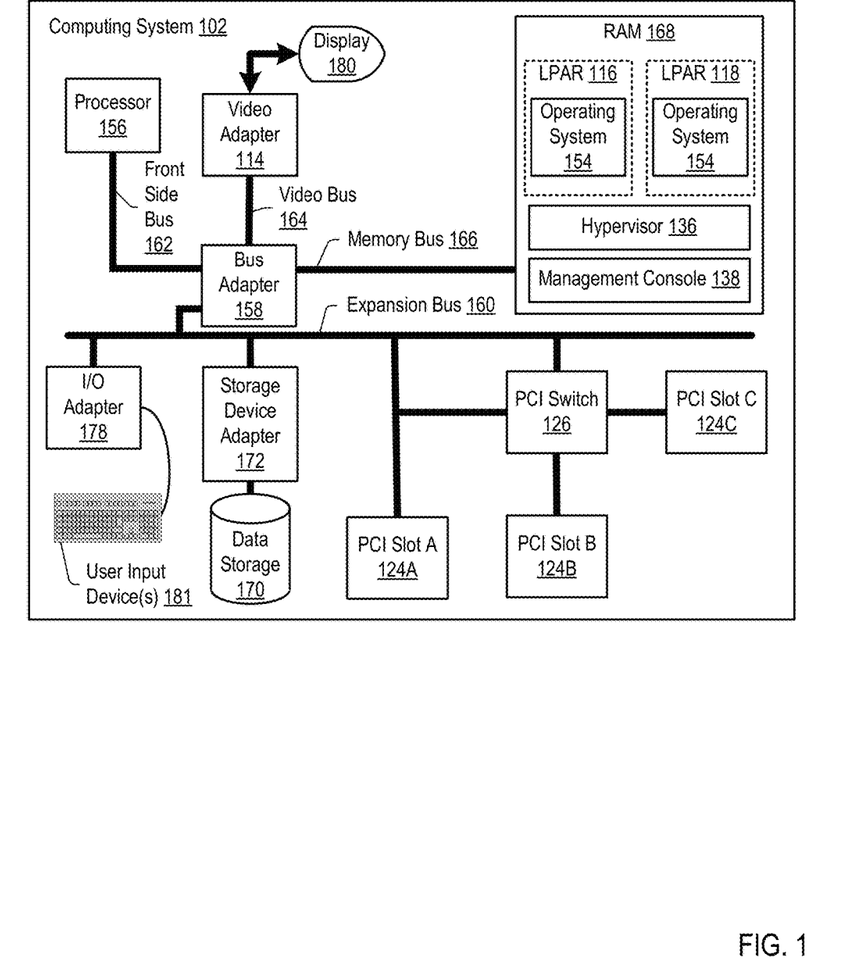
FIG. 1 sets forth a block diagram of an example system configured for dynamically bypassing a peripheral component interconnect (PCI) switch according to embodiments of the present invention.

Exemplary methods, apparatus, and products for dynamically bypassing a peripheral component interconnect (PCI) switch in accordance with the present invention are described with reference to the accompanying drawings, beginning with FIG. 1. FIG. 1 sets forth a network diagram of a system configured for dynamically bypassing a PCI switch according to embodiments of the present invention. The example environment of FIG. 1 includes a computing system (102). Such a computing system (102) may provide clients on host devices (external to the computing system (102)) with virtualization services for enabling various cloud related product offerings.

The example computing system (102) of FIG. 1 includes at least one computer processor (156) or "CPU" as well as random access memory (168) or "RAM," which is connected through a high speed memory bus (166) and bus adapter (158) to processor (156) and to other components of the computing system (102).

Stored in RAM (168) is a hypervisor (136) and a management console (138). The management console (138) may provide a user interface through which a user may direct the hypervisor (136) on instantiating and maintaining multiple logical partitions (116, 118), where each logical partition may provide virtualization services to one or more clients.

Also stored in RAM (168) are two instances of an operating system (154), one for each logical partition (116, 118). Operating systems useful in computers configured for firmware management of SR-IOV adapters according to various embodiments include UNIX™, Linux™, Microsoft Windows™, AIX™, IBM's i™ operating system, and others as will occur to those of skill in the art. The operating systems (154), hypervisor (136), and management console (138) are shown in RAM (168), but many components of such software may typically be stored in non-volatile memory such as, for example, on a data storage (170) device or in firmware (132).

The computing system (102) may also include a storage device adapter (172) coupled through expansion bus (160) and bus adapter (158) to processor (156) and other components of the computing system (102). Storage device adapter (172) connects non-volatile data storage to the computing system (102) in the form of data storage (170). Storage device adapters useful in computers configured for dynamically bypassing a PCI switch according to various embodiments include Integrated Drive Electronics ("IDE") adapters, Small Computing system Interface ("SCSI") adapters, and others as will occur to those of skill in the art. Non-volatile computer memory also may be implemented for as an optical disk drive, electrically erasable programmable read-only memory (so-called "EEPROM" or "Flash" memory), RAM drives, and so on, as will occur to those of skill in the art.

The example computing system (102) may also include one or more input/output ("I/O") adapters (178). I/O adapters implement user-oriented input/output through, for example, software drivers and computer hardware for controlling output to display devices such as computer display screens, as well as user input from user input devices (181)

such as keyboards and mice. The example computing system (102) may also include a video adapter (114), which may be an example of an I/O adapter specially designed for graphic output to a display device (180) such as a display screen or computer monitor. Video adapter (114) may be connected to processor (156) through a high speed video bus (164), bus adapter (158), and the front side bus (162), which may also be a high speed bus.

The expansion bus (160) shown in FIG. 1 also includes a peripheral component interconnect (PCI) switch (126) and several PCI slots (124A, 124B, 124C). The PCI slots (124A, 124B, 124C) may be available or unoccupied adapter terminals within a communications fabric, such as a PCI fabric or PCI-Express fabric. PCI slots (124A, 124B, 124C) may host input/output (I/O) adapter such as a network interface adapter or storage adapter. PCI slots (124A, 124B, 124C) may host an I/O adapter implemented as a single root input/output virtualization (SR-IOV) adapter. As used herein, PCI includes PCI-Express (PCIe).

SR-IOV is an extension to the PCIe specification. SR-IOV allows a device, such as a network adapter, to separate access to its resources among various PCIe hardware functions. These functions consist of the following types: A PCIe Physical Function (PF) and a PCIe Virtual Function (VF). The PF advertises the device's SR-IOV capabilities. Each VF is associated with a device's PF. A VF shares one or more physical resources of the device, such as a memory and a network port, with the PF and other VFs on the device. From the perspective of a logical partition (116, 118) instantiated by a hypervisor (136), a VF appears as a fully functional physical PCIe adapter. In this way, a single physical adapter may be 'shared' amongst many logical partitions or multiple virtual functions may be instantiated for use by a single logical partition. Although referred to as a 'virtual' function, readers of skill in the art will recognize that a VF is in fact a physical channel that is not a resource virtualized entirely by the hypervisor.

Some PCI adapters, such as SR-IOV adapters, may require a greater number of resources relative to other types of adapters. Additionally, some PCI adapters perform optimally on, or even require, a direct connection to the PCI communications fabric (i.e., a connection that does not go through a PCI switch). The resources assigned to and reserved for the adapters attached to the communications fabric include partitional endpoint (PE) numbers, bus/device/function (BDF) ranges, memory mapping input/output (MMIO) addresses, direct memory access (DMA) addresses, and message signal interrupt (MSI) addresses.

Figure 2:
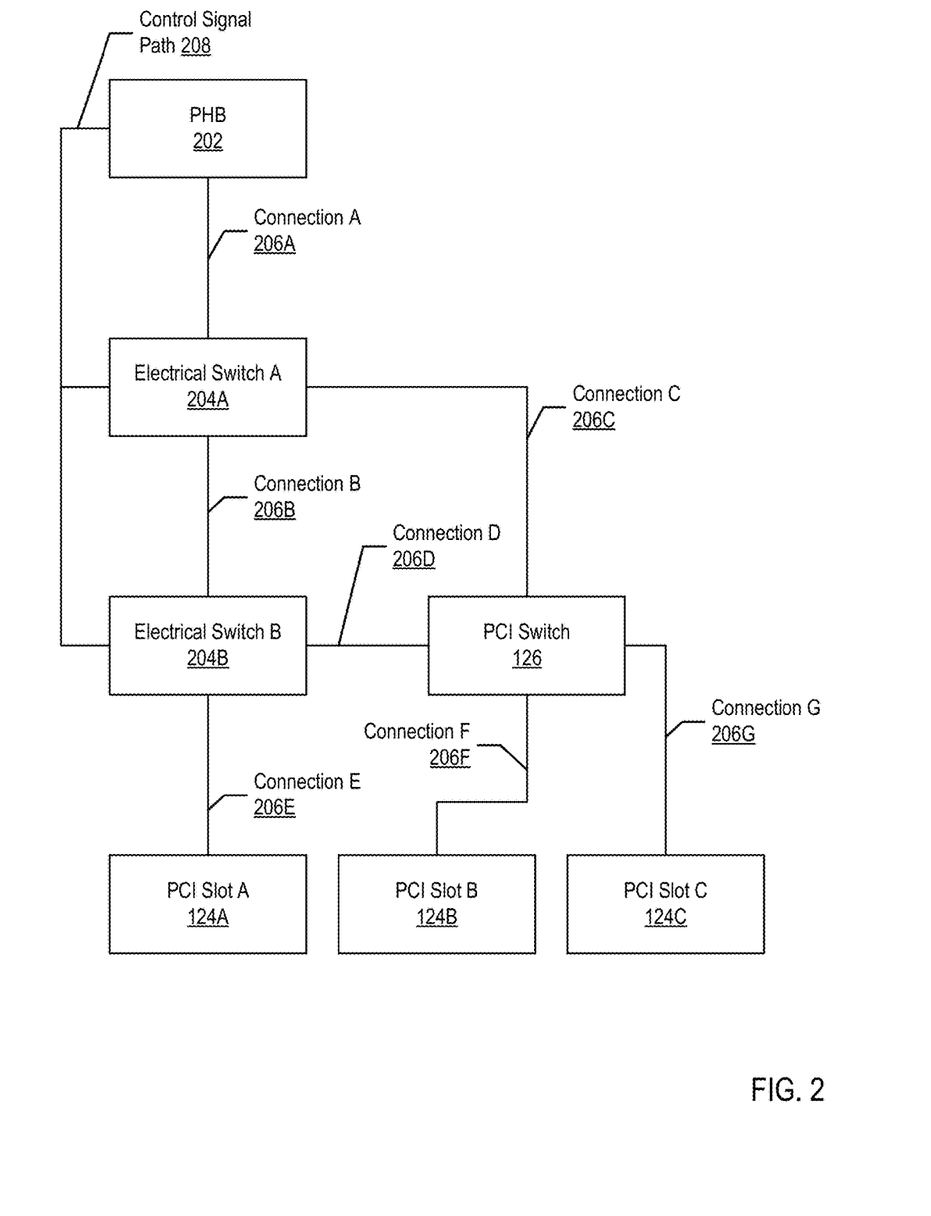
FIG. 2 sets forth a block diagram of an example system configured for dynamically bypassing a PCI switch according to embodiments of the present invention.

FIG. 2 shows an exemplary system for dynamically bypassing a PCI switch according to embodiments of the present invention. Specifically, FIG. 2 shows an exemplary block diagram of a PCI communications fabric that includes a PCI host bridge (PCB) (202), two electrical switches (electrical switch A (204A), electrical switch B (204B)), a PCI switch (126), and three PCI slots (PCI slot A (124A), PCI slot B (124B), PCI slot C (124C)). Each element is connected by a series of connections (connection A (206A), connection B (206B), connection C (206C), connection D (206D), connection E (206E), connection F (206F), connection G (206G)). The PCI host bridge (202) toggles the electrical switches (electrical switch A (204A), electrical switch B (204B)) using a control signal on a control signal path (208).

The PCI host bridge (202) (also referred to as a PCI root complex) is an aggregation of hardware and software that facilitates access between the computing system and PCI devices coupled to PCI slots (PCI slot A (124A), PCI slot B (124B), PCI slot C (124C)). The PCI host bridge (202) also facilitates preparing the PCI devices and PCI slots (PCI slot A (124A), PCI slot B (124B), PCI slot C (124C)) for switching between using a PCI switch (126) and bypassing that PCI switch (126) at run time.

The term "run time" refers to a state of the computing system after the computing system has booted up and before the computing system has been shut down or restarted. An action performed "during run time" refers to an action performed without shutting down, suspending, restarting, or rebooting the computing system.

The connections (connection A (206A), connection B (206B), connection C (206C), connection D (206D), connection E (206E), connection F (206F), connection G (206G)) are data paths between elements in the system. Each connection (connection A (206A), connection B (206B), connection C (206C), connection D (206D), connection E (206E), connection F (206F), connection G (206G)) may be part of a PCI communications fabric and may include a number of communication channels, such as eight or 16 channels. In contrast, the control signal path (208) may include fewer channels, such as only a single channel.

The electrical switches (electrical switch A (204A), electrical switch B (204B)) are hardware devices that connect and sever connections (connection A (206A), connection B (206B), connection C (206C), connection D (206D), connection E (206E)) to and from the PCI host bridge (202). The control signal path (208) is a communication path used by the PCI host bridge (202) to change the state of the electrical switches (electrical switch A (204A), electrical switch B (204B)). The control signal sent on the control signal path (208) may change the state of the electrical switches from a first state to a second state. In the first state, electrical switch A (204A) couples connection A (206A) to connection C (206C), and electrical switch B (204B) couples connection D (206D) to connection E (206E). In the first state, there is no data communication on connection B (206B). In the second state, electrical switch A (204A) couples connection A (206A) to connection B (206B), and electrical switch B (204B) couples connection B (206B) to connection E (206E). In the second state, the PCI switch (126) is bypassed and there is no data communication on connection C (206C), connection D (206D), connection F (206F), or connection G (206G).

The PCI switch (126) is a computer hardware device that can create multiple endpoints out of a single endpoint, enabling multiple devices to share what was initially a single endpoint. As shown in FIG. 2, in the first state of the electrical switches (electrical switch A (204A), electrical switch B (204B)), the PCI switch (126) enables data communication between the PCI host bridge (202) and each of the three PCI slots (PCI slot A (124A), PCI slot B (124B), PCI slot C (124C)).

The PCI slots (PCI slot A (124A), PCI slot B (124B), PCI slot C (124C)) are connection points for PCI adapters. The PCI slots (PCI slot A (124A), PCI slot B (124B), PCI slot C (124C)) may host I/O adapters, such as ethernet adapters, SR-IOV adapters, fiberchannel adapters, and coherent accelerator processor interface adapters. Each PCI slot may be assigned an initial amount of resources. The amount and type of resources assigned may differ between PCI slots and depend on whether the PCI slot is directly connected to the PCI host bridge (202) or whether the PCI slot is connected through a PCI switch (126).

As used here, a communication path that bypasses a PCI switch refers to a communication path that does not include the PCI switch or that transmits data without utilizing the PCI switch. A direct connection refers to a connection that does not go through a PCI switch.

The above-described configuration allows a computing system to change between using a PCI switch (126) and bypassing that PCI switch (126) at run time. To bypass the PCI switch (126), the PCI host bridge (202) resources of the downstream ports of the PCI switch (126) are be combined for use by PCI slot A (124A), and a control signal changes the electrical switches to result in a direct connection between the PCI host bridge (202) and PCI slot A (124A). By unsetting the control signal, the PCI switch (126) would be put back into use and the PCI host bridge (202) resources would be split up amongst PCI slot A (124A), PCI slot B (124B), and PCI slot C (124C).

Figure 3:
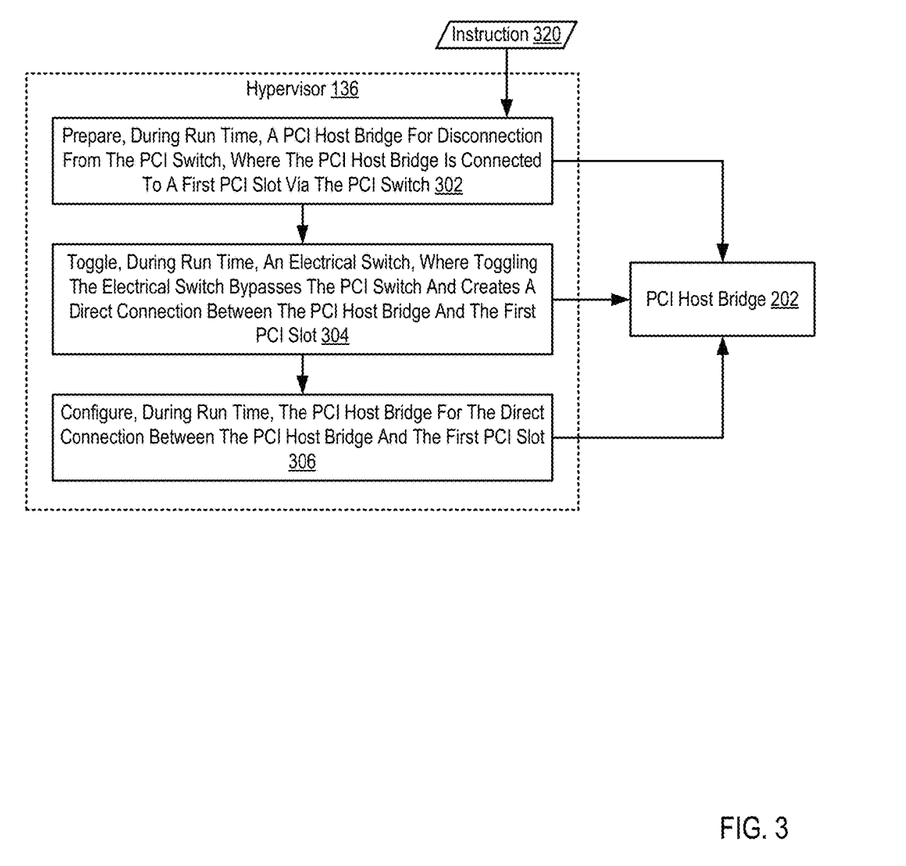
FIG. 3 sets forth a flow chart illustrating an exemplary method for dynamically bypassing a PCI switch according to embodiments of the present invention.

For further explanation, FIG. 3 sets forth a flow chart illustrating an exemplary method for dynamically bypassing a PCI switch according to embodiments of the present invention that includes preparing (302), during run time, a PCI host bridge (202) for disconnection from the PCI switch, wherein the PCI host bridge (202) is connected to a first PCI slot via the PCI switch. Preparing (302), during run time, a PCI host bridge (202) for disconnection from the PCI switch, wherein the PCI host bridge (202) is connected to a first PCI slot via the PCI switch may be carried out by the hypervisor (136) performing tasks necessary for a graceful disconnection of the PCI switch from the PCI host bridge and PCI communications fabric. The PCI switch may connect the PCI host bridge to a number of PCI slots, and each PCI slot may include a PCI adapter.

Preparing (302), during run time, the PCI host bridge (202) for disconnection from the PCI switch may be triggered by an instruction (320). Specifically, at run time, the hypervisor (136) may prepare for the PCI switch bypass based on various inputs. For example, a hardware management console may allow a system administrator, via an instruction (320), to bypass the PCI switch through a user interface. The instruction (320) would therefore be sent from the management console to the hypervisor (136). As another example, the instruction (320) may come in the form of an adapter configuration file on the PCI adapter that includes information that communicates to the hypervisor (136) that the PCI adapter should be directly connected to the PCI host bridge and not through a PCI switch. As yet another example, a physical jumper may be placed or removed, generating the instruction (320) to trigger the PCI switch disconnection.

Preparing (302), during run time, a PCI host bridge (202) for disconnection from the PCI switch may further be carried out by the hypervisor (136) asserting a reset on the PCI host bridge, unconfiguring partitionable endpoints, and reassigning resources including partitionable endpoint numbers, MMIO Windows, and MSIs. A partitionable endpoint is an assignable I/O unit corresponding to a device or part of a device on the PCI communications fabric. At the initial boot time, whether the PCI switch is bypassed or not may be determined by a value stored in a host data area, which may indicate whether or not to bypass the PCI switch (e.g., by setting the control signal).

The method of FIG. 3 further includes toggling (304), during run time, an electrical switch, wherein toggling the electrical switch bypasses the PCI switch and creates a direct connection between the PCI host bridge (202) and the first PCI slot. Toggling (304), during run time, an electrical switch, wherein toggling the electrical switch bypasses the PCI switch and creates a direct connection between the PCI host bridge (202) and the first PCI slot may be carried out by the hypervisor (136) instructing the PCI host bridge (202) to send a control signal to electrical switches on the PCI communications fabric. The control signal may be sent from the PCI host bridge to the electrical switch using a control signal path. Further, the control signal may toggle at least two electrical switches on the PCI communications fabric. As used herein, toggling refers to selecting the first state in a binary system in which the second state is currently selected.

The PCI switch may be connected to a second PCI slot, and creating a direct connection between the PCI host bridge (202) and the first PCI slot may include severing a connection between the PCI host bridge and the second PCI slot. Specifically, bypassing the PCI switch to create a direct connection between the PCI host bridge (202) and the first PCI slot may sever the connection between the PCI host bridge (202) and any other PCI slots connected via the PCI switch.

The method of FIG. 3 further includes configuring (306), during run time, the PCI host bridge (202) for the direct connection between the PCI host bridge (202) and the first PCI slot. Configuring (306), during run time, the PCI host bridge (202) for the direct connection between the PCI host bridge (202) and the first PCI slot may be carried out by the hypervisor (136) performing tasks in preparation for using the direct connection to the first PCI slot. Such tasks may include, for example, creating new software objects for the configuration and reprograming the I/O design architecture (IODA) tables.

The above-described steps improve the operation of the computer system by enabling a system to switch, during run time, between a direct connection to a PCI slot and a connection to multiple PCI slots using a PCI switch. Some PCI adapters require direct connections and a greater number of system resources or perform better when directly connected with a greater number of system resources. Such PCI adapters may include SR-IOV adapters, coherent accelerator processor interface adapters, adapters that drive a group of data storage devices, and adapters with internal switches. Other adapters perform adequately when connected via PCI switch and with fewer resources. Such adapters may include lower bandwidth ethernet adapters, secondary data path adapters, and tape backup adapters.

Enabling a system to switch, during run time, between a direct connection to a PCI slot and a connection to multiple PCI slots using a PCI switch provides flexibility to increase the number of slots to be used by adapters at run time, and flexibility to combine resources at run time for adapters that require more memory and interrupt resources. Enabling a system to switch, during run time, between a direct connection to a PCI slot and a connection to multiple PCI slots using a PCI switch also provides the ability to dynamically remove resources from (or give resources to) empty PCI slots connected to the PCI switch. Further, enabling a system to switch, during run time, between a direct connection to a PCI slot and a connection to multiple PCI slots using a PCI switch also reduces the planning necessary for system administrators because the system configuration can be changed at run time.

Figure 4:
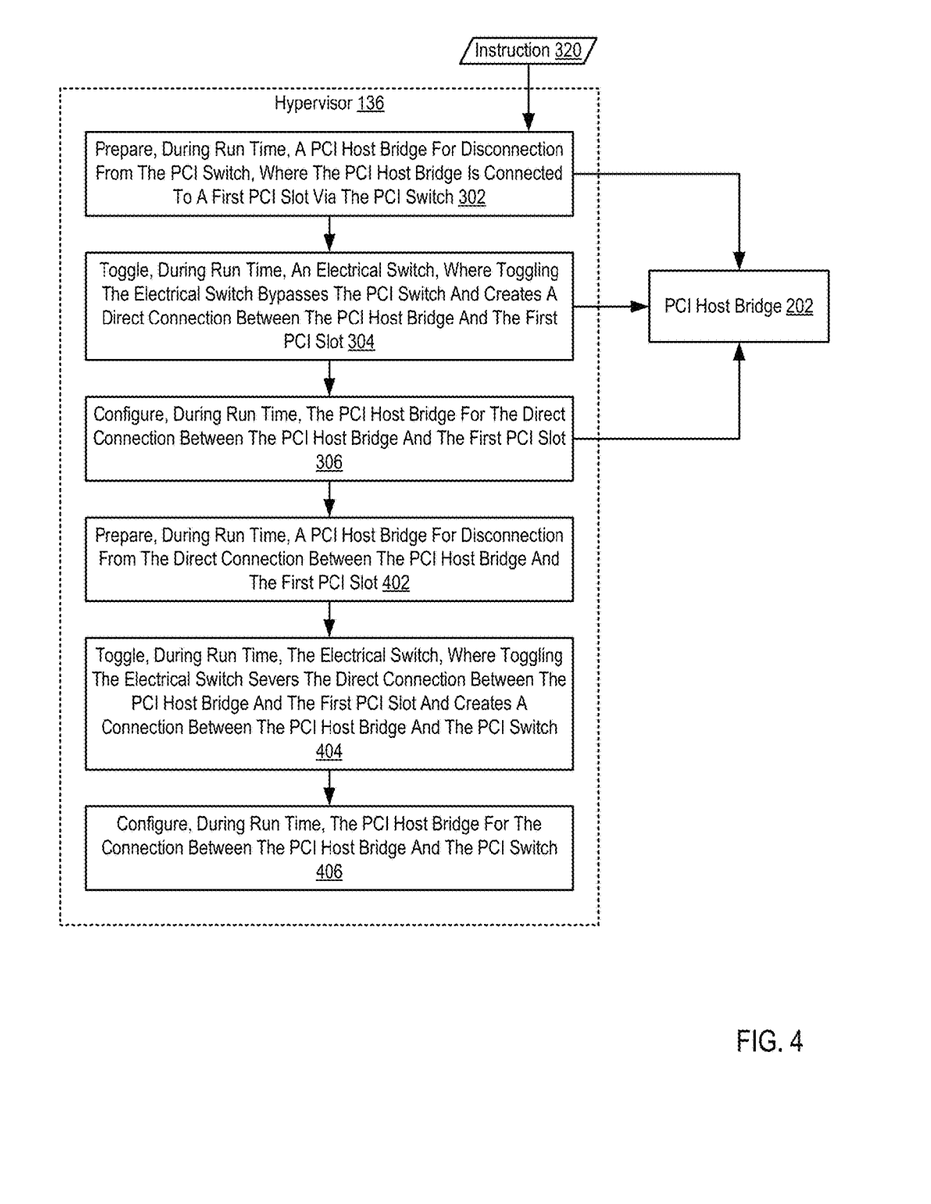
FIG. 4 sets forth a flow chart illustrating an exemplary method for dynamically bypassing a PCI switch according to embodiments of the present invention.

For further explanation, FIG. 4 sets forth a flow chart illustrating a further exemplary method for dynamically bypassing a PCI switch according to embodiments of the present invention that includes preparing (302), during run time, a PCI host bridge (202) for disconnection from the PCI switch, wherein the PCI host bridge (202) is connected to a first PCI slot via the PCI switch; toggling (304), during run time, an electrical switch, wherein toggling the electrical switch bypasses the PCI switch and creates a direct connection between the PCI host bridge (202) and the first PCI slot; and configuring (306), during run time, the PCI host bridge (202) for the direct connection between the PCI host bridge (202) and the first PCI slot.

The method of FIG. 4 differs from the method of FIG. 3, however, in that the method of FIG. 4 further includes preparing (402), during run time, a PCI host bridge (202) for disconnection from the direct connection between the PCI host bridge and the first PCI slot.

Preparing (402), during run time, a PCI host bridge (202) for disconnection from the direct connection between the PCI host bridge and the first PCI slot may be carried out by the hypervisor (136) asserting a reset on the PCI host bridge, unconfiguring partitionable endpoints, and reassigning resources including partitionable endpoint numbers, MMIO Windows, and MSIs. The steps performed in preparing, during run time, a PCI host bridge (202) for disconnection from the direct connection between the PCI host bridge and the first PCI slot are similar to the steps perform in preparing, during run time, a PCI host bridge (202) for disconnection from the PCI switch.

The method of FIG. 4 further includes toggling (404), during run time, the electrical switch, wherein toggling the electrical switch severs the direct connection between the PCI host bridge and the first PCI slot and creates a connection between the PCI host bridge (202) and the PCI switch. Toggling (404), during run time, the electrical switch, wherein toggling the electrical switch severs the direct connection between the PCI host bridge and the first PCI slot and creates a connection between the PCI host bridge (202) and the PCI switch may be carried out by the hypervisor (136) instructing the PCI host bridge (202) to send a control signal to electrical switches on the PCI communications fabric. The control signal may be sent from the PCI host bridge to the electrical switch using the control signal path. Further, the control signal may toggle at least two electrical switches on the PCI communications fabric. The result of toggling (404), during run time, the electrical switch may include the first PCI slot being connected to the PCI host bridge (202) via the PCI switch.

The method of FIG. 4 further includes configuring (406), during run time, the PCI host bridge (202) for the connection between the PCI host bridge (202) and the PCI switch. Configuring (406), during run time, the PCI host bridge (202) for the connection between the PCI host bridge (202) and the PCI switch may be carried out by the hypervisor (136) assigning resources for the PCI slots on the PCI switch, creating and configuring the software objects for the PCI slots on the PCI switch, initializing the IODA tables, starting PCI data communication between the PCI host bridge (202) and the PCI switch, and initializing the PCI switch.

Figure 5:
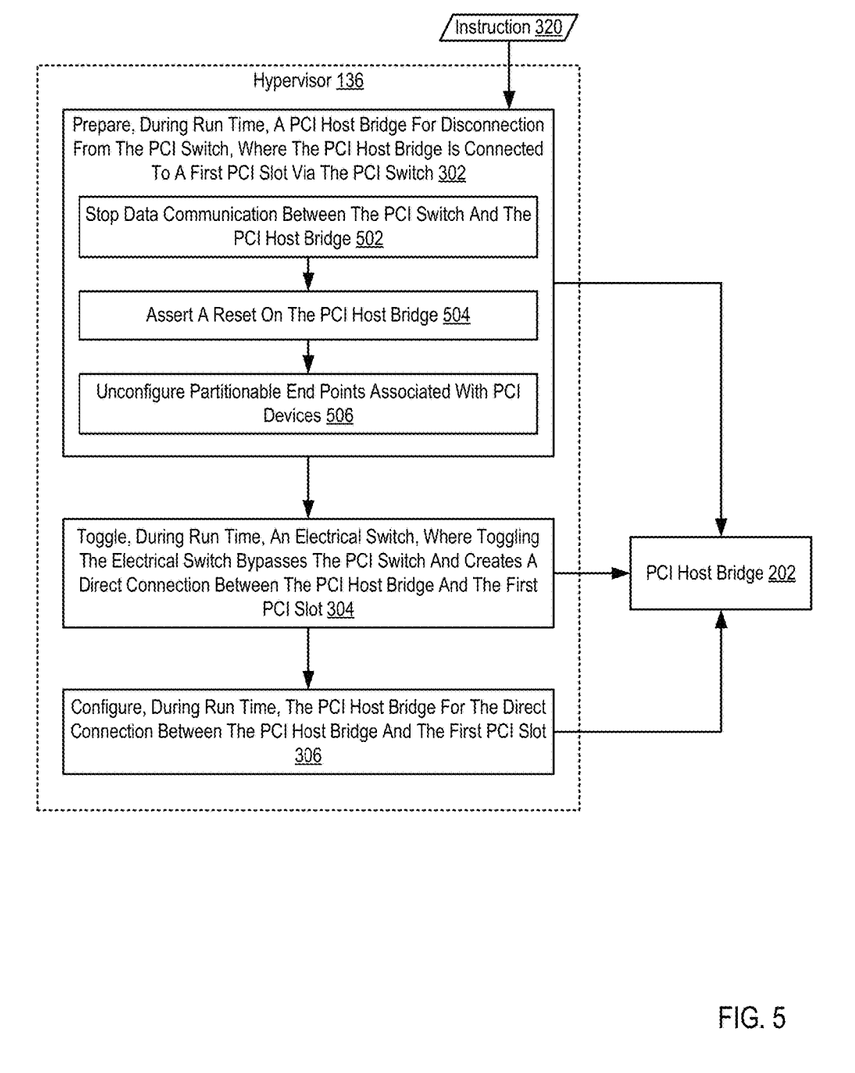
FIG. 5 sets forth a flow chart illustrating an exemplary method for dynamically bypassing a PCI switch according to embodiments of the present invention.

For further explanation, FIG. 5 sets forth a flow chart illustrating a further exemplary method for dynamically bypassing a PCI switch according to embodiments of the present invention that includes preparing (302), during run time, a PCI host bridge (202) for disconnection from the PCI switch, wherein the PCI host bridge (202) is connected to a first PCI slot via the PCI switch; toggling (304), during run time, an electrical switch, wherein toggling the electrical switch bypasses the PCI switch and creates a direct connection between the PCI host bridge (202) and the first PCI slot; and configuring (306), during run time, the PCI host bridge (202) for the direct connection between the PCI host bridge (202) and the first PCI slot.

The method of FIG. 5 differs from the method of FIG. 3, however, in that preparing (302), during run time, a PCI host bridge (202) for disconnection from the PCI switch, wherein the PCI host bridge (202) is connected to a first PCI slot via the PCI switch includes stopping (502) data communication between the PCI switch and the PCI host bridge (202); asserting (504) a reset on the PCI host bridge (202); and unconfiguring (506) partitionable end points associated with PCI devices.

Stopping (502) data communication between the PCI switch and the PCI host bridge (202) may be carried out by the hypervisor (136) preventing any new data transfers on the PCI communications fabric. Asserting (504) a reset on the PCI host bridge (202) may be carried out by the hypervisor (136) signaling each logical partition and device on the PCI communications fabric to complete any currently ongoing activity and prepare for the resource removal. Once the reset has been asserted on the PCI communications fabric, the reset may then be asserted on the PCI host bridge (202). Asserting the reset on the PCI host bridge (202) causes the PCI host bridge (202) to remove existing settings for the PCI communications fabric.

Unconfiguring (506) partitionable end points associated with PCI devices may be carried out by the hypervisor (136) removing the partitionable endpoints from the logical partitions and releasing resources assigned to each PCI slot and partitionable endpoint. The hypervisor (136) may also clear the IODA tables that are the hardware implementation of the partitionable endpoints.

Figure 6:
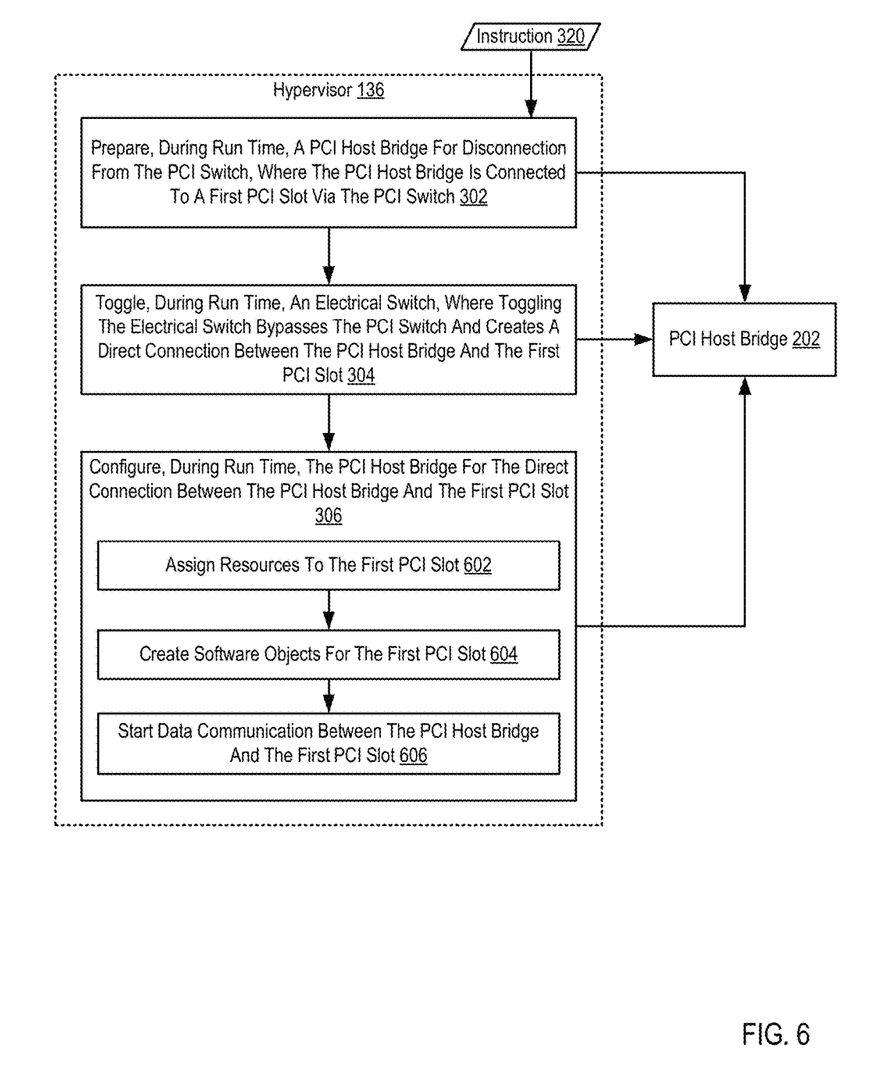
FIG. 6 sets forth a flow chart illustrating an exemplary method for dynamically bypassing a PCI switch according to embodiments of the present invention.

For further explanation, FIG. 6 sets forth a flow chart illustrating a further exemplary method for dynamically bypassing a PCI switch according to embodiments of the present invention that includes preparing (302), during run time, a PCI host bridge (202) for disconnection from the PCI switch, wherein the PCI host bridge (202) is connected to a first PCI slot via the PCI switch; toggling (304), during run time, an electrical switch, wherein toggling the electrical switch bypasses the PCI switch and creates a direct connection between the PCI host bridge (202) and the first PCI slot; and configuring (306), during run time, the PCI host bridge (202) for the direct connection between the PCI host bridge (202) and the first PCI slot.

The method of FIG. 6 differs from the method of FIG. 3, however, in that configuring (306), during run time, the PCI host bridge (202) for the direct connection between the PCI host bridge (202) and the first PCI slot includes assigning (602) resources to the first PCI slot; creating (604) software objects for the first PCI slot; and starting (606) data communication between the PCI host bridge (202) and the first PCI slot.

Assigning (602) resources to the first PCI slot may be carried out by the hypervisor (136) calculating an amount and type of resources necessary for the directly connected PCI slot. The hypervisor (136) may assign a greater number of resources to the directly connected PCI slot than were previously assigned to any of the PCI slots connected via the PCI switch. The hypervisor (136) may assign a majority of the available resources to the directly connected PCI slot.

Creating (604) software objects for the first PCI slot may be carried out by the hypervisor (136) generating software structures representing each physical PCI slot, and creating software structures for the device tree on the operating system. Each of the software objects may be configured with information about the resources assigned to that PCI slot, and how the PCI slot is connected to the PCI communications fabric (e.g., directly or via a PCI switch). The hypervisor (136) may also initialize the IODA tables for the partitionable endpoints for the devices on the PCI communications fabric.

Starting (606) data communication between the PCI host bridge (202) and the first PCI slot may be carried out by the hypervisor (136) signaling to the logical partitions that data transfers may begin on the PCI communications fabric.

In view of the explanations set forth above, readers will recognize that the benefits of dynamically bypassing a PCI switch according to embodiments of the present invention include:

Improving the operation of a computing system by allowing the PCI fabric configuration to be changed at run time, without requiring the system to be rebooted, addressing the problem of switch latency, limited resources, and constrained adapter flexibility.

Improving the operation of a computing system by enabling an increase to the total number of pluggable adapter slots on a system, as well as an increase in the number of resource heavy adapters that can be plugged into a system, increasing computing system utility.

Exemplary embodiments of the present invention are described largely in the context of a fully functional computer system for dynamically bypassing a PCI switch. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of dynamically bypassing a peripheral component interconnect (PCI) switch, the method comprising:
    preparing, during run time, a PCI host bridge for disconnection from the PCI switch, wherein the PCI host bridge is connected to a first PCI slot via the PCI switch;
    toggling, during run time, an electrical switch, wherein toggling the electrical switch bypasses the PCI switch and creates a direct connection between the PCI host bridge and the first PCI slot; and
    configuring, during run time, the PCI host bridge for the direct connection between the PCI host bridge and the first PCI slot.

2. The method of claim 1, further comprising:
    preparing, during run time, a PCI host bridge for disconnection from the direct connection between the PCI host bridge and the first PCI slot;
    toggling, during run time, the electrical switch, wherein toggling the electrical switch severs the direct connection between the PCI host bridge and the first PCI slot and creates a connection between the PCI host bridge and the PCI switch; and
    configuring, during run time, the PCI host bridge for the connection between the PCI host bridge and the PCI switch.

3. The method of claim 1, wherein preparing, during run time, the PCI host bridge for disconnection from the PCI switch comprises:
    stopping data communication between the PCI switch and the PCI host bridge;
    asserting a reset on the PCI host bridge; and
    unconfiguring partitionable end points associated with PCI devices.

4. The method of claim 1, wherein configuring, during run time, the PCI host bridge for the direct connection between the PCI host bridge and the first PCI slot comprises:
    assigning resources to the first PCI slot;
    creating software objects for the first PCI slot; and
    starting data communication between the PCI host bridge and the first PCI slot.

5. The method of claim 1, wherein toggling, during run time, the electrical switch comprises sending a control signal from the PCI host bridge to the electrical switch using a control signal path.

6. The method of claim 1, wherein toggling, during run time, the electrical switch comprises toggling at least two electrical switches.

7. The method of claim 1, wherein the PCI switch is connected to a second PCI slot, and wherein toggling, during run time, the electrical switch severs a connection between the PCI host bridge and the second PCI slot.

8. An apparatus for dynamically bypassing a peripheral component interconnect (PCI) switch, the apparatus comprising a computer processor, a computer memory operatively coupled to the computer processor, the computer memory having disposed within it computer program instructions that, when executed by the computer processor, cause the apparatus to carry out the steps of:
    preparing, during run time, a PCI host bridge for disconnection from the PCI switch, wherein the PCI host bridge is connected to a first PCI slot via the PCI switch;
    toggling, during run time, an electrical switch, wherein toggling the electrical switch bypasses the PCI switch and creates a direct connection between the PCI host bridge and the first PCI slot; and
    configuring, during run time, the PCI host bridge for the direct connection between the PCI host bridge and the first PCI slot.

9. The apparatus of claim 8, wherein the computer program instructions further cause the apparatus to carry out the steps of:
    preparing, during run time, a PCI host bridge for disconnection from the direct connection between the PCI host bridge and the first PCI slot;
    toggling, during run time, the electrical switch, wherein toggling the electrical switch severs the direct connection between the PCI host bridge and the first PCI slot and creates a connection between the PCI host bridge and the PCI switch; and
    configuring, during run time, the PCI host bridge for the connection between the PCI host bridge and the PCI switch.

10. The apparatus of claim 8, wherein preparing, during run time, the PCI host bridge for disconnection from the PCI switch comprises:
    stopping data communication between the PCI switch and the PCI host bridge;
    asserting a reset on the PCI host bridge; and
    unconfiguring partitionable end points associated with PCI devices.

11. The apparatus of claim 8, wherein configuring, during run time, the PCI host bridge for the direct connection between the PCI host bridge and the first PCI slot comprises:
assigning resources to the first PCI slot;
creating software objects for the first PCI slot; and
starting data communication between the PCI host bridge and the first PCI slot.

12. The apparatus of claim 8, wherein toggling, during run time, the electrical switch comprises sending a control signal from the PCI host bridge to the electrical switch using a control signal path.

13. The apparatus of claim 8, wherein toggling, during run time, the electrical switch comprises toggling at least two electrical switches.

14. The apparatus of claim 8, wherein the PCI switch is connected to a second PCI slot, and wherein toggling, during run time, the electrical switch severs a connection between the PCI host bridge and the second PCI slot.

15. A computer program product for dynamically bypassing a peripheral component interconnect (PCI) switch, the computer program product disposed upon a non-transitory computer readable storage medium, the computer program product comprising computer program instructions that, when executed, cause a computer to carry out the steps of:
preparing, during run time, a PCI host bridge for disconnection from the PCI switch, wherein the PCI host bridge is connected to a first PCI slot via the PCI switch;
toggling, during run time, an electrical switch, wherein toggling the electrical switch bypasses the PCI switch and creates a direct connection between the PCI host bridge and the first PCI slot; and
configuring, during run time, the PCI host bridge for the direct connection between the PCI host bridge and the first PCI slot.

16. The computer program product of claim 15, wherein the computer program instructions further cause the computer to carry out the steps of:
preparing, during run time, a PCI host bridge for disconnection from the direct connection between the PCI host bridge and the first PCI slot;
toggling, during run time, the electrical switch, wherein toggling the electrical switch severs the direct connection between the PCI host bridge and the first PCI slot and creates a connection between the PCI host bridge and the PCI switch; and
configuring, during run time, the PCI host bridge for the connection between the PCI host bridge and the PCI switch.

17. The computer program product of claim 15, wherein preparing, during run time, the PCI host bridge for disconnection from the PCI switch comprises:
stopping data communication between the PCI switch and the PCI host bridge;
asserting a reset on the PCI host bridge; and
unconfiguring partitionable end points associated with PCI devices.

18. The computer program product of claim 15, wherein configuring, during run time, the PCI host bridge for the direct connection between the PCI host bridge and the first PCI slot comprises:
assigning resources to the first PCI slot;
creating software objects for the first PCI slot; and
starting data communication between the PCI host bridge and the first PCI slot.

19. The computer program product of claim 15, wherein toggling, during run time, the electrical switch comprises sending a control signal from the PCI host bridge to the electrical switch using a control signal path.

20. The computer program product of claim 15, wherein toggling, during run time, the electrical switch comprises toggling at least two electrical switches.

* * * * *